United States Patent [19]

Sullivan

[11] Patent Number: 4,542,571

[45] Date of Patent: Sep. 24, 1985

[54] REAR AXLE BEARING PULLER

[76] Inventor: Woodard R. Sullivan, 1900 Curtis, Florissant, Mo. 63031

[21] Appl. No.: 590,368

[22] Filed: Mar. 16, 1984

[51] Int. Cl.$^4$ .............................................. B23P 19/04

[52] U.S. Cl. ........................................ 29/256; 29/258; 29/426.1; 29/426.5; 29/724

[58] Field of Search ....................... 29/256, 258, 426.1, 29/426.5, 724

[56] References Cited

U.S. PATENT DOCUMENTS

| | | | |
|---|---|---|---|
| 1,381,101 | 6/1921 | Albertson | 29/426.5 |
| 1,499,082 | 6/1924 | Stadler | 29/256 |
| 2,872,728 | 2/1959 | Fraser | 29/256 |
| 3,142,899 | 8/1964 | Meyer | 29/426.5 X |
| 4,235,004 | 11/1980 | Floyd | 29/256 |

FOREIGN PATENT DOCUMENTS

| | | | |
|---|---|---|---|
| 2328646 | 1/1975 | Fed. Rep. of Germany | 29/256 |
| 322376 | 6/1957 | Switzerland | 29/256 |

*Primary Examiner*—Howard N. Goldberg
*Assistant Examiner*—Ronald S. Wallace

[57] ABSTRACT

The present invention relates to a puller for rapid removal of an automobile rear axle bearing from its housing and similar situated components which includes an insertion element provided with a threaded hole and a pair of handle mounting apertures therein in combination with a handle mounted thereon and a pressure bar provided with an aperture therein and a bolt adapted to screw into the insertion element.

1 Claim, 2 Drawing Figures

REAR AXLE BEARING PULLER

BACKGROUND OF THE INVENTION

Convention techniques for removing automobile rear axle bearing and other elements of this nature are many and varied. Most devices of this nature have attempted to accomplish the task of removing a bearing from its housing under circumstances which do not provide easy access to the inner surface of the bearing. In particular the problem is to remove a cylindrically shaped bearing from a shaft with only one end of the shaft available, without damaging the bearings as quickly as possible.

SUMMARY OF THE INVENTION

It is therefore an object of the present invention to provide a bearing puller device which comprises an insertion element generally in the form of a flat plate provided with a threaded aperture in the flat surface thereof and handle mounting apertures in the side thereof in combination with a handle, a pressure bar, and a threaded bolt.

An object of the present invention is to provide such a device which may be inserted into the space containing an automobile rear axle bearing, while said bearing is in place in the axle, and then pivoting the insertion element such that it spans substantially the diameter of the bearing and then disposing the pressure bar against the housing and inserting the bolt through the pressure bar and into the threaded hole in the insertion element.

A further object of the present invention is to provide such a device which is simply and economically manufactured and used.

These together with other objects and advantages which will become subsequently apparent, reside in the details and construction and operation as more fully hereinafter described and claimed, reference being had to the accompanying drawings forming a part hereof, wherein like numerals refer to like parts throughout, and in which;

DETAILED DESCRIPTION OF THE INVENTION

Figure 1:
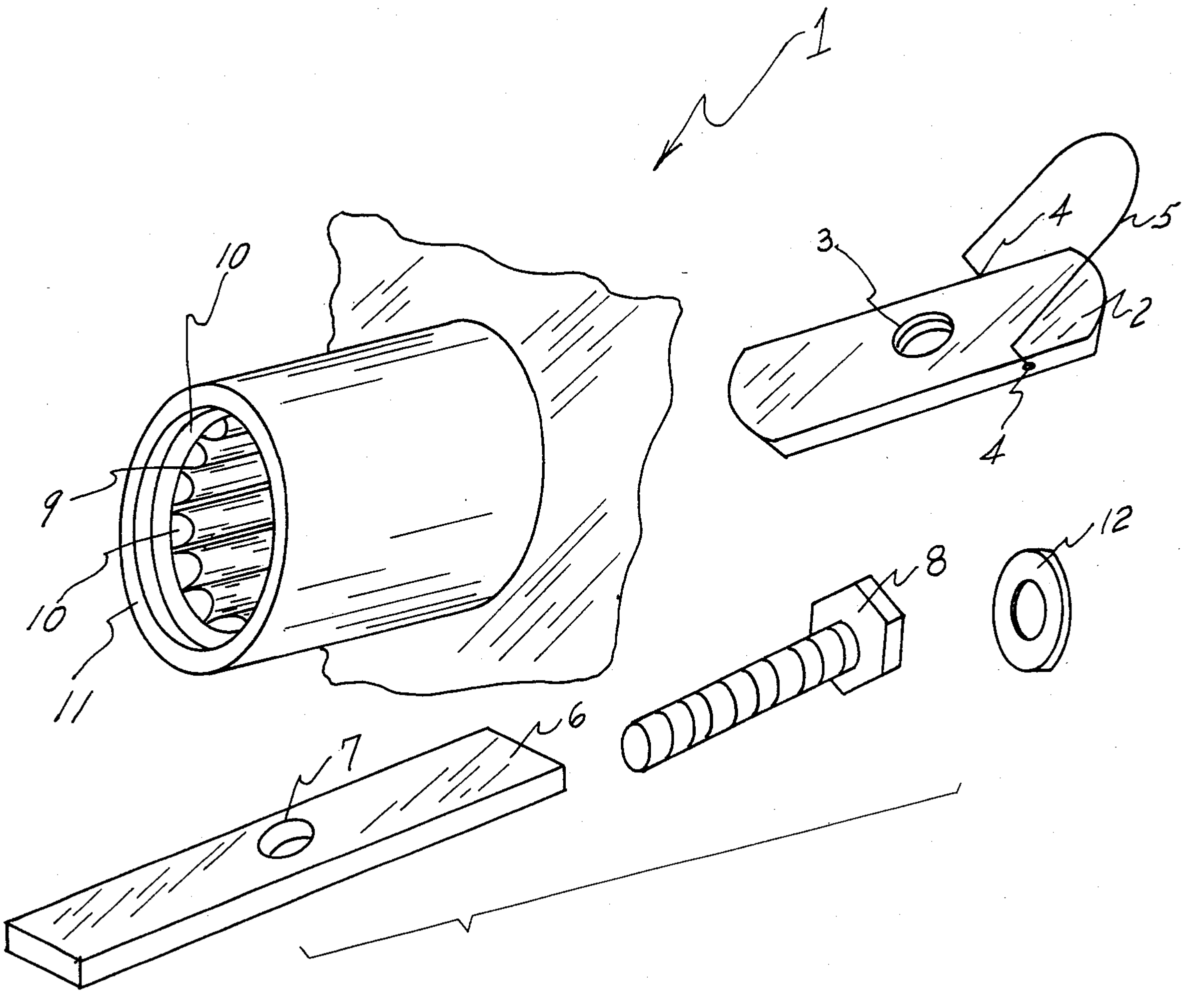
FIG. 1 is a perspective view of a bearing puller device construction in accordance with and embodying the present invention.

Referring now in more detail and by reference characters to the drawings which illustrate practical embodiments of the present invention, FIG. 1, is a perspective view of a bearing 10, constructed in accordance with, used in and embodying the present invention.

As shown in FIG. 1, bearing device, 1, comprises an insertion element, 2, generally in the shape of a wide plate provided with a thread aperture, 3, and handle mounting apertures, 4, in the sides thereof, handle means, 5, and pressure bar, 6, provided with aperture, 7, therein, and bolt, 8.

Figure 2:
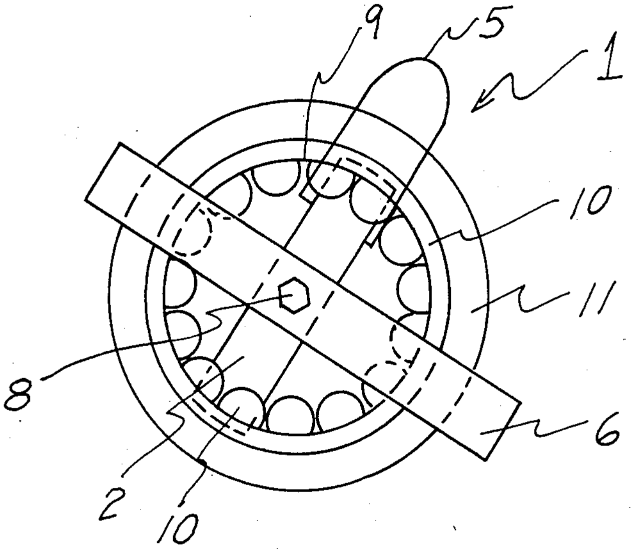
FIG. 2 is a plan view of the device in FIG. 1, mounted to the bearing housing.

In its preferred embodiment, the device is used by pivoting insertion element, 2, into general alignment with handle means, 5, than insertion element, 2, into the inner space, 9, of bearing, 10, while bearing, 10, is mounted in bearing housing, 11. Insertion element, 2, is again pivoted, now disposed transverse to the longitudinal axis of the bearing and disposed as shown in FIG. 2. While holding insertion element, 2, against the backwall of bearing, 10, bolt, 8, is inserted through aperture, 7, in pressure bar, 6, and threaded into aperture, 3, in insertion element, 2. This disposition is shown in FIG. 2. As bolt, 8, utilizing washer, 12, is threaded further into aperture, 3, pressure bar, 6, bears against housing, 11, and the insertion element bears against the back wall of the bearing causing the bearing to be forced towards the pressure bar and out of the housing.

It should be understood that changes and modifications in the form, construction, arrangement, and combination of the bearing device and methods of making and using the same may be made and substituted for those herein shown and described without departing from the nature and principle of my invention.

Having thus described my invention, what I claim as new and desire to secure by United States Letters Patent is:

1. A bearing puller comprising
 - an insertion element provided with a threaded aperture therein,
 - handle means pivotally mounted on said insertion element,
 - a pressure bar, provided with an aperture therein, and
 - bolt means operably disposed in the aperture in said pressure bar and the threaded aperture in said insertion element.

* * * * *